(12) United States Patent  (10) Patent No.: US 7,740,189 B2
Meyer et al.  (45) Date of Patent: Jun. 22, 2010

(54) SUSPENSION ARRANGEMENT FOR A BOOM LIFT ASSEMBLY OF AN AGRICULTURAL SPRAYER

(75) Inventors: Peter R. Meyer, Holloway, MN (US); James Keppers, Benson, MN (US)

(73) Assignee: CNH America LLC, New Holland, PA (US)

( * ) Notice: Subject to any disclaimer, the term of this patent is extended or adjusted under 35 U.S.C. 154(b) by 372 days.

(21) Appl. No.: 11/350,550

(22) Filed: Feb. 9, 2006

(65) Prior Publication Data

US 2007/0181710 A1  Aug. 9, 2007

(51) Int. Cl.
B05B 1/20 (2006.01)
A62C 13/62 (2006.01)
B05B 3/02 (2006.01)
B05B 1/28 (2006.01)
B05B 9/06 (2006.01)
A01G 25/09 (2006.01)

(52) U.S. Cl. .................. 239/159; 239/308; 239/160; 239/164; 239/166; 239/172; 239/176; 239/77; 239/146; 239/292; 239/300; 239/167

(58) Field of Classification Search .................. 239/159, 239/308, 160, 164, 166, 172, 176, 77, 146, 239/290, 292, 300, 167
See application file for complete search history.

(56) References Cited

U.S. PATENT DOCUMENTS

| 1,470,246 | A |   | 10/1923 | Willis et al. |         |
|-----------|---|---|---------|---------------|---------|
| 2,793,909 | A |   | 5/1957  | Gerbracht     |         |
| 3,848,625 | A | * | 11/1974 | Courtright    | 239/733 |
| 3,967,684 | A |   | 7/1976  | Haverdink     |         |
| 4,074,766 | A |   | 2/1978  | Orthman       |         |
| 4,186,879 | A | * | 2/1980  | Kinder        | 239/172 |
| 4,372,492 | A | * | 2/1983  | Blumenshine   | 239/168 |
| 4,379,522 | A |   | 4/1983  | Elliott et al.|         |
| 4,553,702 | A | * | 11/1985 | Coffee et al. | 239/690 |
| 4,607,708 | A |   | 8/1986  | Landphair et al.|       |
| 4,660,654 | A | * | 4/1987  | Wiebe et al.  | 172/776 |
| 4,867,245 | A |   | 9/1989  | Stevens       |         |
| 4,962,892 | A | * | 10/1990 | Sauer         | 239/722 |
| 5,098,018 | A | * | 3/1992  | Hadar et al.  | 239/77  |

(Continued)

OTHER PUBLICATIONS

U.S. Appl. No. 11/096,368, filed Apr. 1, 2005, Thompson et al.

(Continued)

*Primary Examiner*—Dinh Q Nguyen
*Assistant Examiner*—Steven Cernoch
(74) *Attorney, Agent, or Firm*—Rebecca Henkel

(57) ABSTRACT

A suspension arrangement mounted in support of a boom lift assembly and boom supported thereon on a chassis of an agricultural sprayer is provided. The boom lift assembly is configured to move the boom between a raised, inoperative position and a lowered, operative position. The suspension arrangement includes a pivot linkage pivotally coupling the boom lift assembly and the chassis, and a dampener located between the boom lift assembly and the chassis. During operation of the sprayer, the dampener of the suspension arrangement reduces transfer of an impact force or stress force from transferring between the chassis and the boom lift assembly so as to isolate suspension of the boom lift assembly from the chassis of the sprayer.

7 Claims, 6 Drawing Sheets

U.S. PATENT DOCUMENTS

| | | | | |
|---|---|---|---|---|
| 5,375,767 | A * | 12/1994 | Thorstensson | 239/164 |
| 5,630,547 | A * | 5/1997 | Klemenhagen et al. | 239/161 |
| 5,918,808 | A * | 7/1999 | Weddle | 239/1 |
| 5,950,926 | A | 9/1999 | Chahley et al. | |
| 6,012,648 | A | 1/2000 | Morris | |
| 6,027,039 | A * | 2/2000 | Mercil | 239/159 |
| 6,047,901 | A * | 4/2000 | Pederson et al. | 239/159 |
| 6,059,201 | A | 5/2000 | Weddle | |
| 6,343,661 | B1 * | 2/2002 | Thompson et al. | 172/444 |
| 6,367,712 | B1 * | 4/2002 | Larsen | 239/159 |
| 6,422,483 | B1 * | 7/2002 | Yocom et al. | 239/159 |
| 6,622,935 | B1 * | 9/2003 | Owens et al. | 239/77 |
| 6,647,904 | B1 * | 11/2003 | Mariman et al. | 111/62 |
| 6,659,374 | B1 * | 12/2003 | Chiera | 239/587.2 |
| 7,429,003 | B2 * | 9/2008 | Thompson et al. | 239/167 |
| 2003/0192961 | A1 * | 10/2003 | Tango | 239/146 |
| 2004/0158381 | A1 * | 8/2004 | Strelioff et al. | 701/50 |
| 2006/0245904 | A1 * | 11/2006 | Thompson et al. | 414/723 |

OTHER PUBLICATIONS

U.S. Appl. No. 11/097,000, filed Apr. 1, 2005, Thompson et al.

\* cited by examiner

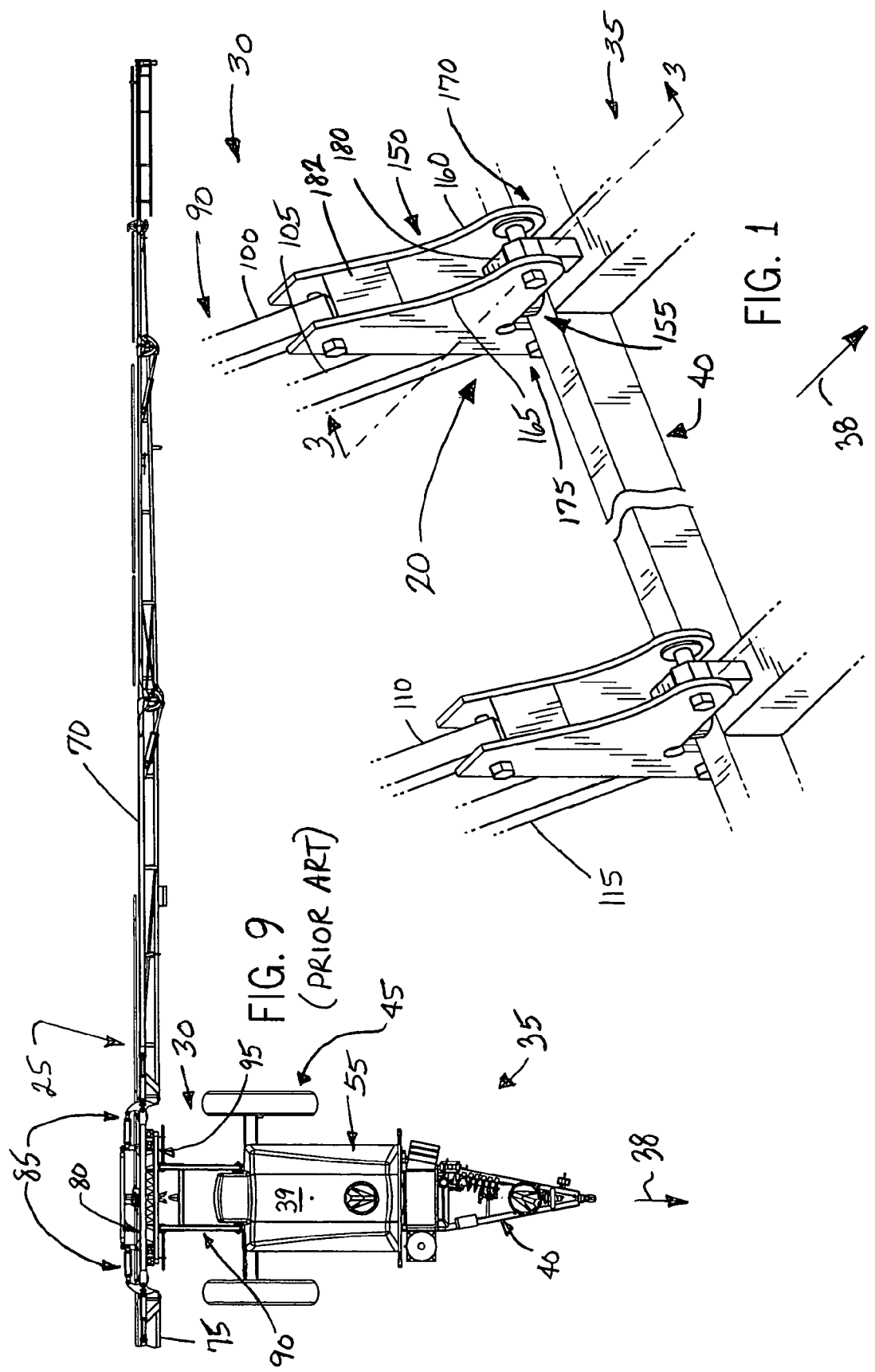

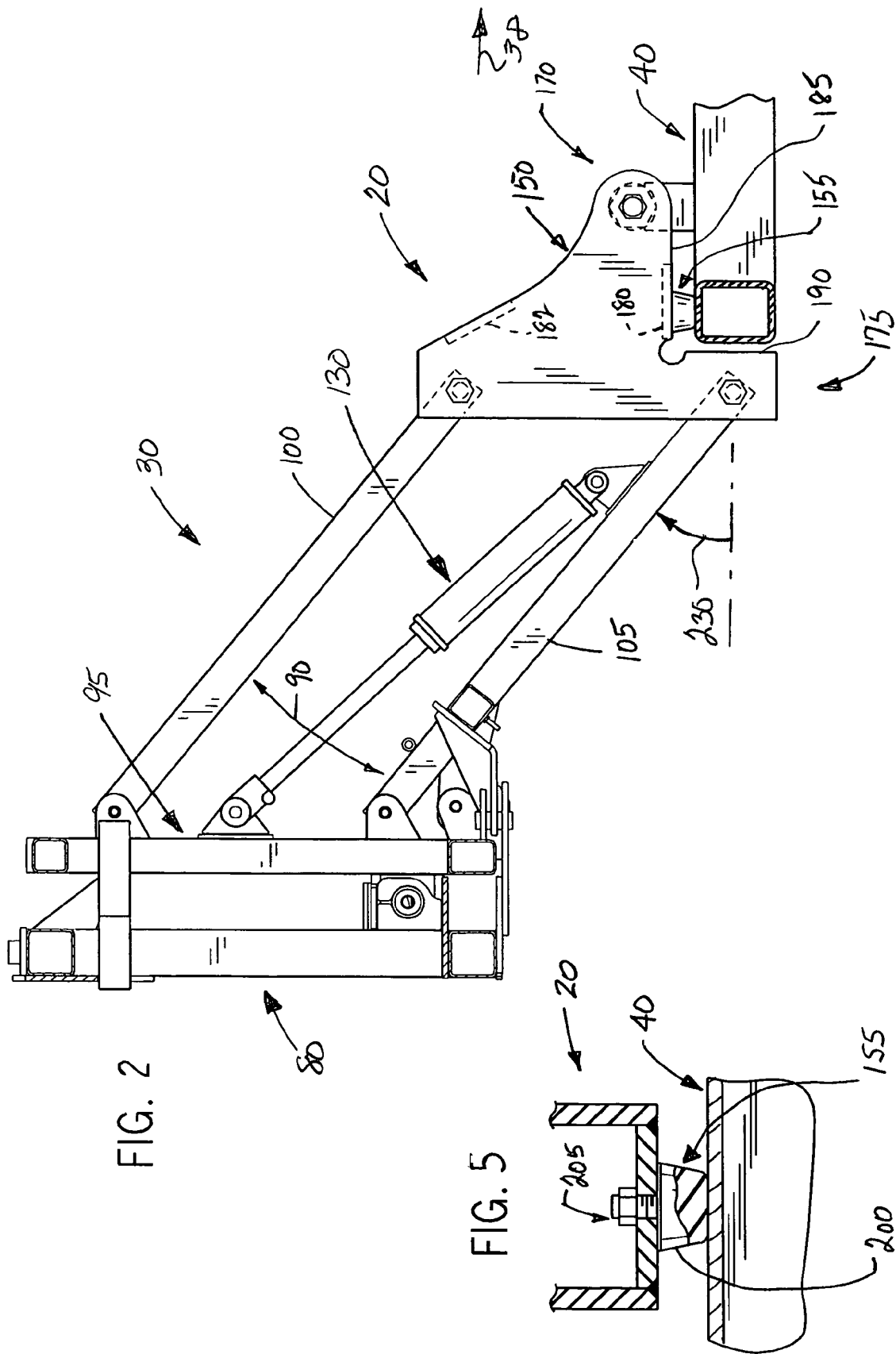

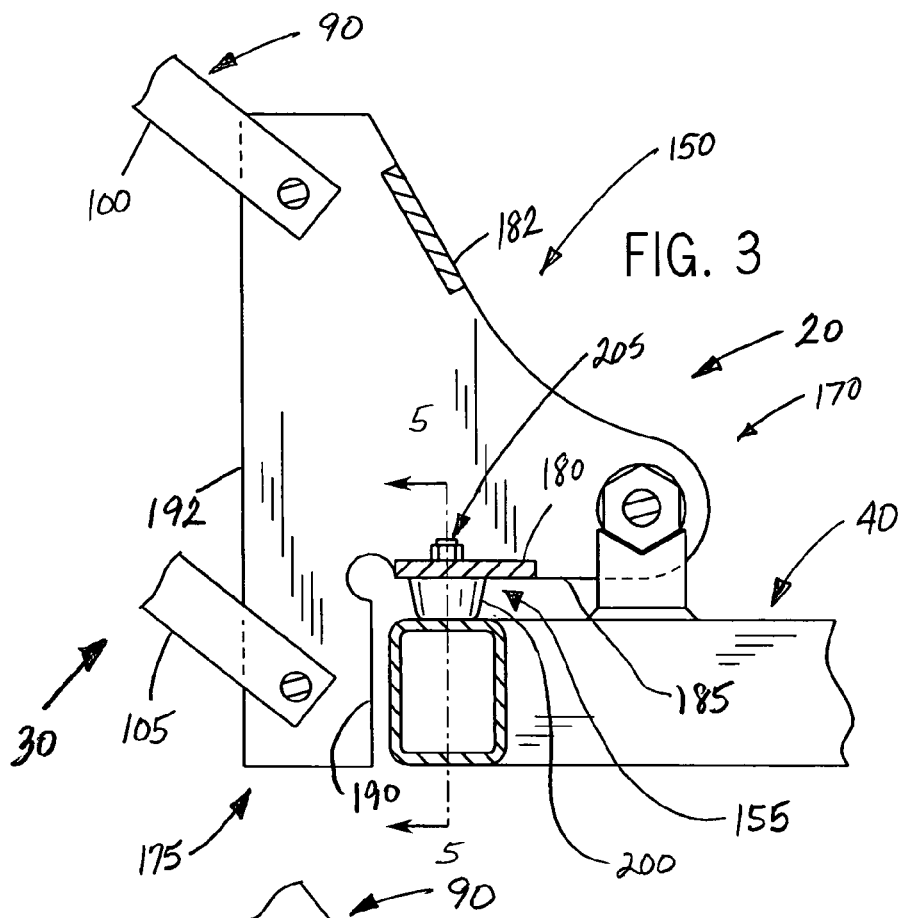
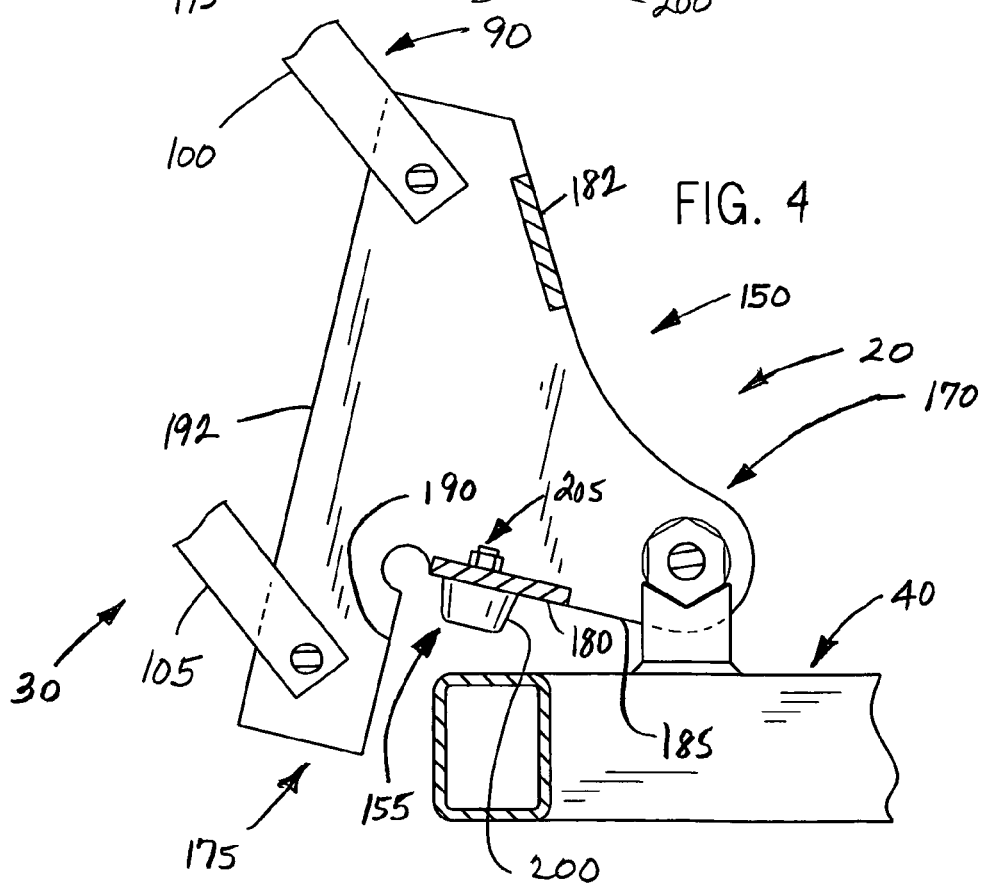

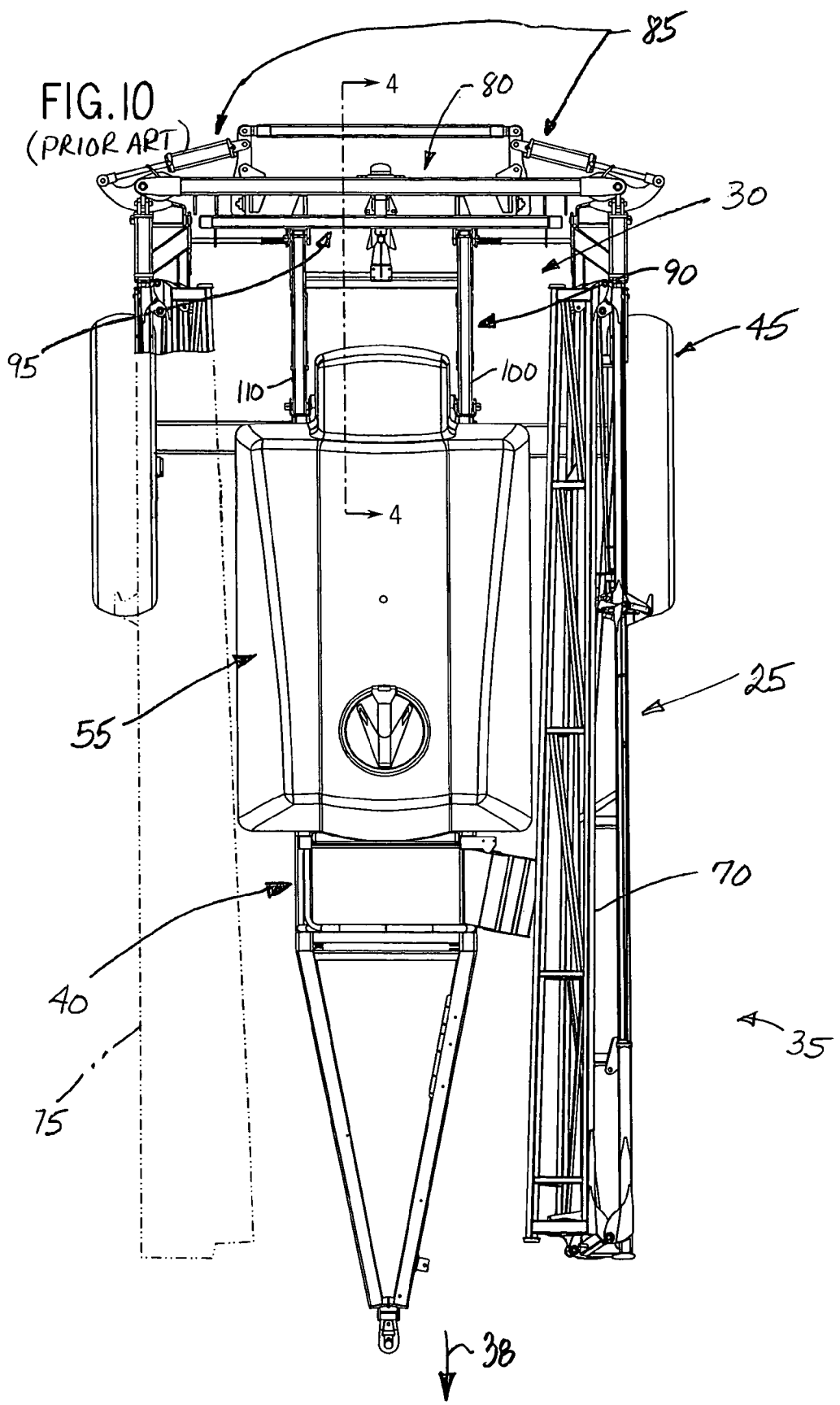

SUSPENSION ARRANGEMENT FOR A BOOM LIFT ASSEMBLY OF AN AGRICULTURAL SPRAYER

CROSS-REFERENCE TO RELATED APPLCATIONS

Not applicable.

BACKGROUND OF THE INVENTION

1. Field of the Invention

The invention relates to a suspension arrangement for a boom lift assembly and boom that are mounted on an agricultural sprayer, and more specifically, relates to a suspension arrangement configured to float the boom lift assembly and boom independent of a chassis of the agricultural sprayer.

2. Description of the Related Art

Boom assemblies are commonly used on agricultural vehicles or towed implements (e.g., sprayers or planters, etc.) to dispense seed, fertilizer, insecticide, herbicide, etc. and other miscellaneous agricultural materials. The boom assembly is usually mounted on a chassis moveably supported on a wheel assembly to be motorized or towed across the field. The typical boom assembly is configured to pivot or fold between operative and inoperative positions relative to the boom support vehicle. In its operative position, the boom assembly commonly extends in a laterally outward direction from the boom support vehicles up to a distance of ninety-feet or larger such that the agricultural applicator covers a large surface area with each pass across a field. The weight of the boom assembly generally correlates with its operative length.

Upon completing distribution of the agricultural materials to the field, a conventional boom lift assembly (e.g., manual, hydraulic, pneumatic, etc.) is employed in a known manner to raise each of the booms to a raised, inoperative position. Once raised, manually or automatically operated pivot mechanisms (e.g. hydraulic, pneumatic, etc.) are employed to swing, pivot or fold each of the booms to a folded position for transport. The preferred folded position of the booms is generally parallel to the direction of travel of the support vehicle such that each of the booms and the support vehicle has a narrow profile for ready transport from the field to a roadway.

However, known boom lift assemblies in movable support of a boom on a mobile chassis of an agricultural sprayer have drawbacks. For example, during normal operation of the boom assembly in the field, the boom, the boom lift assembly and the chassis encounter miscellaneous impact or stress forces associated with traveling over rough terrain and/or moving the boom between the raised and lowered positions described above. Although known sprayers have a suspension to generally float the boom in general alignment with the terrain, this suspension does isolate these miscellaneous impact forces from transferring from the boom and/or boom lift assembly to the chassis of the sprayer. These impact forces increase opportunities for failure of the chassis and/or the boom lift assembly.

Therefore, there is a need or desire for a suspension arrangement that is overcomes the foregoing difficulties and drawbacks of the prior art. The suspension arrangement should also be simple and reliable to operate and economical to manufacture. In addition, the suspension arrangement should be configured to be utilized with a wide variety of motorized or towed boom lift implements in addition to those related to agriculture.

SUMMARY OF THE INVENTION

The present invention provides a suspension arrangement for and a method of suspending a boom lift assembly associated with raising a boom assembly mounted on a chassis of a towed implement or vehicle that meets the desires and needs described above. The suspension arrangement of the present invention thus enhances the ready transition of the boom assembly from an extended, lowered, operative position to a raised, inoperative position to be pivoted to a folded, stowed position ready for transport.

In a first embodiment of the present invention, a suspension arrangement for an implement having a boom lift assembly operatively connected to move a boom between a lowered, operative position and raised, inoperative position relative to a chassis of an agricultural sprayer is provided. The suspension arrangement comprises a pivot linkage pivotally coupling the boom lift assembly and the chassis, and a dampener located between the boom lift assembly and the chassis. The dampener reduces transfer of an impact force between the chassis and the boom lift assembly.

The preferred pivot linkage includes a first pivot plate member generally in parallel alignment with a second pivot plate member, and both first and second pivot plate member in general vertical alignment and parallel relative to the forward direction of travel. The boom lift assembly is pivotally interconnected between the first and the second pivot plate members. Each first and second pivot plate member includes a forward end and an opposite rearward portion relative to the direction of travel. The forward end is pivotally coupled at the chassis, and the rearward portion is pivotally coupled at the boom lift assembly. The pivot linkage comprises a generally horizontal aligned, intermediate plate member extending between the first and second pivot plate members, and the dampener is mounted between the chassis and the intermediate plate member. Each first and second pivot plate member includes a generally horizontal aligned linear edge extending between the forward end and the rearward portion. The rearward portion of both first and second pivot plate members includes a generally vertically aligned edge that is generally perpendicular to and intersects the linear edge. The linear edge and the vertically aligned edge receive the chassis therebetween.

The dampener can be an active type (e.g., hydraulic, pneumatic, etc.) or manual type of suspension member (e.g., gas shock, isolators, air bag, etc.) operable to dampen or absorb an impact force associated with operation of the sprayer in the field. Specifically in one embodiment, the dampener includes a compressed fluid (e.g., pneumatic, hydraulic, etc.) configured to absorb an impact force. Another embodiment of the dampener includes a spring. Yet another specific embodiment of the dampener includes an elastomeric material operable to absorb the impact force. Still yet another specific embodiment of the dampener includes a spring.

In another embodiment, the present invention provides an agricultural sprayer that includes a chassis in support of a storage tank on a wheel assembly, a boom that moves between an extended position and a folded position for transport, a boom lift assembly mounted on the chassis and operatively connected to move the boom between a lowered, operative position and a raised, inoperative position. The sprayer further includes a suspension arrangement located between the boom lift assembly and the chassis of the agricultural sprayer.

The suspension arrangement is configured to reduce an impact force associated with operation of the sprayer from transferring between the boom lift assembly and the chassis of the sprayer.

In accordance with another aspect of the invention, a method of supporting a boom on a chassis of an agricultural sprayer vehicle is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 illustrates a partial perspective view of a suspension arrangement of the present invention employed in combination with a boom lift assembly supported on a chassis of an agricultural sprayer, the boom lift assembly in a raised position.

FIG. 2 illustrates a side elevation view of the suspension arrangement in combination with the boom lift assembly shown in FIG. 1, the boom lift assembly in the raised position.

FIG. 3 illustrates a detailed cross-section view along line 3-3 in FIG. 2.

FIG. 4 illustrates a cross-section view of the suspension arrangement shown in FIG. 2, the pivot linkage in a raised, pivot position.

FIG. 5 illustrates a detailed cross-section view along line 5-5 in FIG. 3.

FIG. 9 illustrates a top plan view of a known towed agricultural sprayer with a boom assembly in a lowered, extended position for operation in the field.

FIG. 10 illustrates a top plan view of the known towed agricultural sprayer shown in FIG. 9 in a raised, folded position ready for transport.

DETAILED DESCRIPTION OF THE INVENTION

Figure 6:
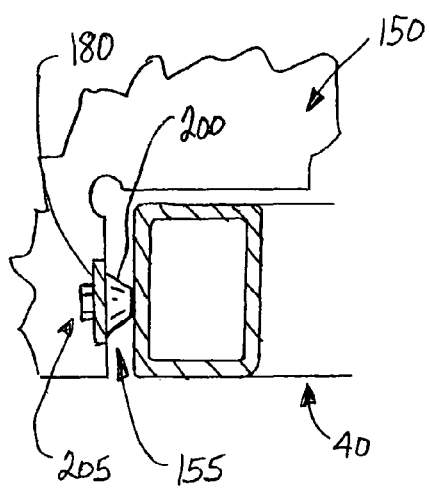
FIG. 6 illustrates a partial detailed cross-section view of a suspension arrangement in FIG. 1, the dampener located at an alternative rearward position relative to the chassis of the agricultural sprayer.

FIGS. 1 and 2 show a suspension arrangement 20 in accordance with the present invention employed in combination with a boom assembly 25 movably supported by a boom lift assembly 30 on a boom support implement 35 configured to be towed in a forward direction of travel 38 (See FIGS. 9 and 10). As shown in FIGS. 9 and 10, one embodiment of the boom support implement 35 is a conventional towed agricultural sprayer 39 of a type commonly used to apply crop pesticides, nutrients or animal/human waste (sludge) to soils, typically before and after planting in the spring and/or after harvest in the fall.

Still referring to FIGS. 9 and 10, the exemplary boom support implement 35 generally includes a chassis 40 supported on plurality of oversized wheel assemblies 45. The chassis 40 is in support of a reservoir or storage tank 55 in fluid connection with a series of nozzles mounted on the boom assembly 25. With the boom assembly 25 in the lowered, extended position (See FIG. 9) for operation in the field, agricultural product is communicated in a known manner from the reservoir 55 to the series of spray nozzles for distribution across a wide surface area of the field.

Figure 11:
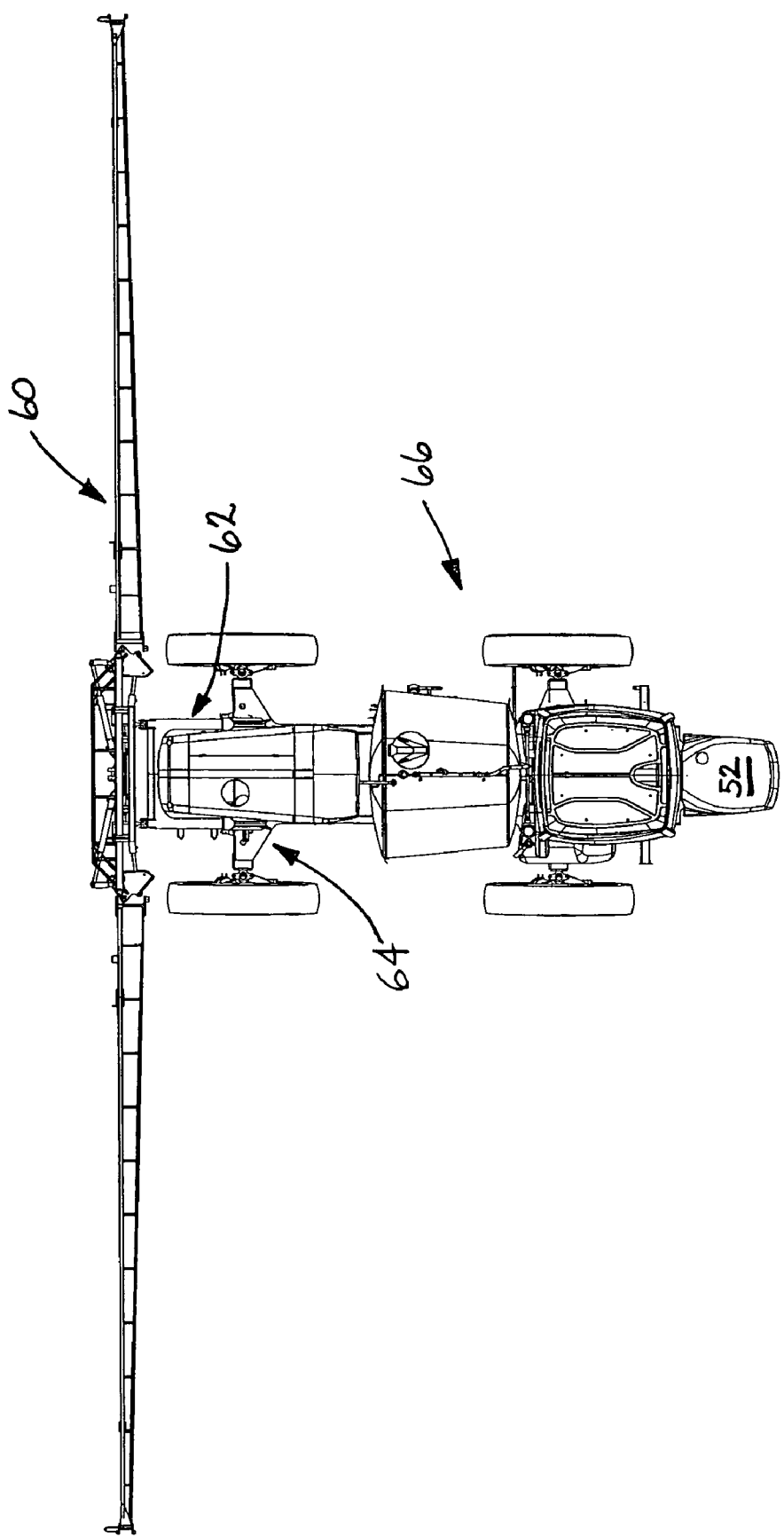
FIG. 11 illustrates a top plan view of a known vehicular agricultural sprayer with a boom assembly in a lowered, extended position for operation in the field.

Although the suspension arrangement 20 of the present invention is described in combination with a chassis 40 of a towed agricultural sprayer 39, it should be understood that the invention is not so limited. The suspension arrangement 20 can be employed in combination with a boom assembly 60 and boom lift assembly 62 supported on a chassis 64 of a vehicular agricultural sprayer 66 (See FIG. 11) in a similar manner and is not limiting on the invention.

The boom assembly 25 generally includes a left boom 70 and a right boom 75, each mounted by the series of spray nozzles in fluid connection with the reservoir 55. The boom assembly 25 also includes a central boom frame structure 80 in pivotal support of the left and right booms 70 and 75. The left and right booms 70 and 75 each are pivotably moveable by a conventional pivot actuator mechanism(s) 85 in a known manner so as to move the booms 70 and 75 and between the extended, operative position (See FIG. 9) and the folded, inoperative position (See FIG. 10). Although the illustrated pivot actuator mechanism 85 is hydraulic driven, it is understood that the type of pivot actuator mechanism 85 (e.g., hydraulic, pneumatic, manual, etc.) can vary.

As illustrated in FIGS. 9 and 10, the boom lift assembly 30 generally includes a lift linkage 90 pivotally coupled to a carrying frame 95. The lift linkage 90 is generally operable to move the carrying frame 95 and the boom assembly 25 supported thereon between the lowered, extended position (See FIG. 9) and the raised, folded position (FIG. 10). As shown in more detail in FIG. 1, the preferred lift linkage 90 generally includes an upper left linkage member 100 and a lower left linkage member 105, and an upper right linkage member 110 and lower right linkage member 115. As shown in FIG. 2, one end of each of the upper and lower left linkage members 100 and 105, respectively, and the upper and lower right linkage members 110 and 115, respectively, is pivotally attached at the carrying frame 95 about a horizontally-aligned pivot axis. The other end of the each of the upper and lower left linkage members 100 and 105 and the upper and lower right linkage members 110 and 115 is pivotally attached at the suspension arrangement 20.

Still referring to FIG. 2, a conventional lift actuator mechanism 130 is configured to drive or move the lift linkage 90 so as to lift and lower the carrying frame 95 and boom assembly 25 supported thereon. Once the lift actuator mechanism 130 and lift linkage 90 have raised the boom assembly 25 to the raised, inoperative position (See FIG. 4), the conventional pivot actuator mechanism 85 is operable to move the boom assembly 25 to the folded, inoperative position for transport, as shown in FIG. 10. Although the illustrated lift actuator mechanism 130 is hydraulic-driven, it is understood that the mechanism type (e.g., hydraulic, pneumatic, manual, etc.) can vary. The carrying frame 95 is generally a conventional tubular frame structure coupled in pivotal support of the boom assembly 25 to the lift linkage 90. It should be understood that other types of carrying frames can employed in support of the boom assembly 25 and is not limiting on the invention.

As shown in FIGS. 1 and 2, the suspension arrangement 20 of the invention is in support of the boom assembly 25 and the boom lift assembly 30 on the chassis 40 of the implement 35. During operation of the implement 35, the suspension arrangement 20 is configured to "float" the boom assembly 25 and boom lift assembly 30 on the chassis 40 in a manner that reduces or decreases transfer of an impact or stress force between the chassis 40 and the boom lift assembly 30. The suspension arrangement 20 thereby reduces opportunities for structural damage or failure caused by impact forces associated with operation of the boom assembly 25, boom lift assembly 30 and implement 35. The exemplary suspension arrangement 20 generally includes a pivot linkage 150 pivotally coupling the boom lift assembly 30 at the chassis 40, and a dampener 155 located between the boom lift assembly 30 and the chassis 40. The "floating" effect of the suspension arrangement 20 is generally provided by the design of the pivotal movement of the pivot linkage 150 in combination with the dampener 155 so as to absorb or dissipate these miscellaneous impact or stress forces and thereby isolate these forces from communicating between the boom lift assembly 30 and the chassis 40, as described in more detail later.

Referring specifically to FIG. 1, the pivot linkage 150 includes a first pivot plate member 160 generally parallel in alignment with a second pivot plate member 165. Both first and second pivot plate members 160 and 165 are in general vertical alignment and parallel relative to the forward direction of travel 38 of the implement 35. The boom lift assembly 30 is pivotally interconnected between the first and the second pivot plate members 160 and 165. Each first and second pivot plate members 160 and 165 includes a forward end 170 and an opposite rearward free end 175 relative the direction of travel 38. The forward end 170 is pivotally coupled at the chassis 40. The rearward free end 175 is free to pivot away from the chassis 40, yet is pivotally coupled at the boom lift assembly 30. The pivot linkage 150 further includes a pair of generally horizontal aligned, intermediate plate members 180 and 182 extending between the first and second pivot plate members 160 and 165. The intermediate plate members 180 and 182 provide, inter alia, structural support to the pivot linkage 150. Each first and second pivot plate member 160 and 165 includes a generally horizontal aligned, linear edge 185 extending between the forward end 170 and the rearward free end 175. A lower surface of the intermediate plate member 180 is mounted between the plate members 160 and 165 generally flush with the linear edge 185. The rearward free end 175 of both first and second pivot plate members 160 and 165 defines an inner edge 190 spaced forward relative to an outer edge 192, both edges 190 and 192 being generally vertically aligned and linear. The inner edge 190 is generally perpendicularly aligned relative to the linear edge 185 so as to receive the chassis 40 therebetween. The outer edge 192 is vertical and linear between the upper and lower limits of the pivot linkage 150.

As shown in FIGS. 2-4, the dampener 155 is located between the chassis 40 and the pivot linkage 150. The exemplary embodiment of the dampener 155 is a manual suspension type that includes a body member 200 comprised of an elastomeric material and connected by a fastener 205 underneath the intermediate plate member 180. FIGS. 1-5 show the body member 200 located to engage an upper surface of the chassis 40. Yet, it should be understood to one skilled in the art that the location of the dampener 155 between the boom lift assembly 30 and the chassis 40 can vary. For example, FIG. 6 shows the intermediate plate member 180 and attached body member 200 located to engage a most rearward side surface of the chassis 40.

Figure 7:
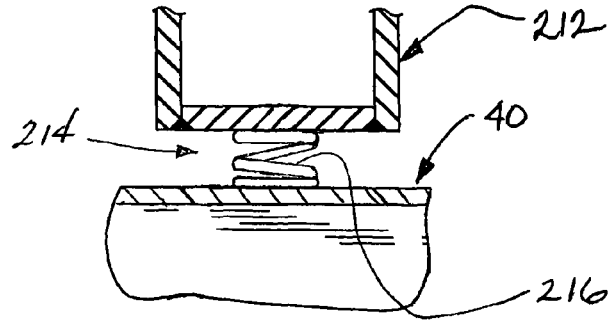
FIG. 7 illustrates a partial detailed cross-section view of an alternative embodiment of a suspension arrangement of the present invention.
Figure 8:
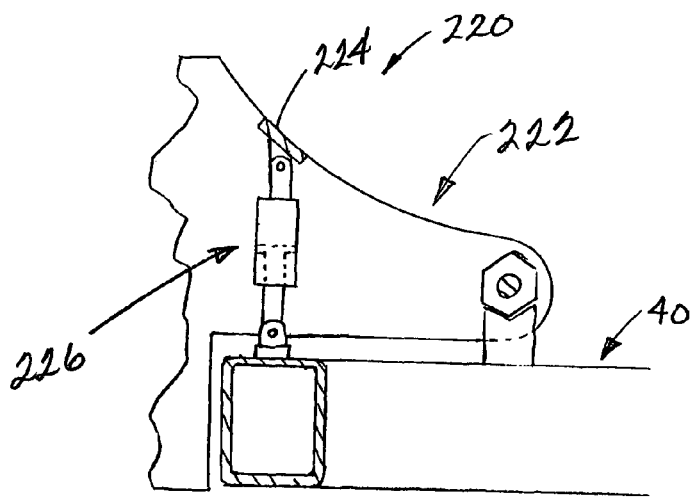
FIG. 8 illustrates a partial detailed cross-section view yet another alternative embodiment of a suspension arrangement of the present invention.

FIG. 7 shows yet another embodiment of a suspension arrangement 210 having a pivot linkage 212 similar in construction to pivot linkage 150 of the suspension arrangement 20 described above. In contrast, a dampener 214 includes a spring 216 located between the chassis 40 and the pivot linkage 212. Another embodiment of the dampener includes a spring (not shown). FIG. 8 shows yet another embodiment of a suspension arrangement 220 having a pivot linkage 222 with an intermediate member 224 similar in construction to the pivot linkage 150 described above. A dampener 226 is an active-type and includes a compressed fluid mechanism (e.g., hydraulic, pneumatic, etc.) configured to operate in a manner similar to the manual-type dampeners 155 and 214 described above as further described below. Of course, it should be understood to one skilled in the art that the suspension arrangement of the invention can include one or more of the above described dampeners 155, 214 and 226 or any combination thereof and is not limiting on the invention.

Having described the construction of the suspension arrangement 20 in accordance with the present invention, the following is a general description of the operation of the suspension arrangement 20 in combination with the boom lift assembly 30 and supported boom assembly 25 on the chassis 40 of the sprayer implement 35. Assume for example that the lift linkage 90 holds the carrying frame 95 and the booms 70 and 75 of the boom assembly 25 in a lowered, operative position (See FIG. 1) for spraying and distribution of product across the field. As the implement 35 moves across the rough terrain associated with field operation, the suspension arrangement 20 is operable to "float" the boom assembly 25 and boom lift assembly 30 in relation to the chassis 40 in a manner such that miscellaneous impact forces on the implement 35 associated with the rough terrain are isolated and not communicated between the chassis 40 and the boom lift assembly 30 and boom assembly 25 supported thereon. This "floating" suspension arrangement 20 not only enhances the smooth spray coverage of product across the field, but also reduces opportunities for structural failure and/or wear and tear at the boom assembly 25, the boom lift assembly 30, and the chassis 40. When finished in the field, the operator activates the lift actuator mechanism(s) 130 to cause the lift linkage 90 of the boom lift assembly 30 to raise (illustrated by arrow 230 in FIG. 2) the attached carrying frame 95 and boom assembly 25 to the raised, inoperative position. The pivot actuator mechanism 85 moves the boom 70 in a forward direction toward the folded position (See FIG. 10). Miscellaneous impact or stress forces associated with raising/lowering movement and folding/unfolding movement the boom assembly 25 and boom lift assembly 30 are also generally isolated by the suspension arrangement 20 from communicating between the boom lift assembly 30 and the chassis 40. Thereby, the suspension arrangement also enhances the smooth transition in securing the booms 70 and 75 in the proper position to make ready for transport or operation in the field.

While the invention has been shown and described with respect to particular embodiments, it is understood that alternatives and modifications are possible and are contemplated as being within the scope of the present invention. For example, although the above described suspension arrangement 20 is described with reference to an agricultural sprayer, one skilled in the art will recognize that the present invention is not so limited. A wide variety of boom support vehicles and towed implements can employ the suspension arrangement 20 of the present invention. In addition, although a certain lift linkage 90 is shown operatively connected to move the carrying frame 95 and the boom assembly 25, it should be understood that the suspension arrangement 20 of the present invention can be employed to "float" a wide variety of and boom lift assemblies 30 and boom assemblies 25 supported thereon and is not limiting on the invention.

Many changes and modifications could be made to the invention without departing from the spirit thereof. The scope of these changes will become apparent from the appended claims.

We claim:

1. A suspension arrangement for supporting a boom lift assembly and a boom supported thereon on a chassis of an agricultural sprayer traveling in a forward direction of travel, the boom lift assembly configured to move the boom between a raised, inoperative position and a lowered, operative position, comprising:
    said boom lift assembly include a lift linkage;
    said lift linkage includes a lower left linkage member generally parallel to an upper right linkage member;
    said lower left linkage member and said upper right linkage member have opposing first and second ends;
    said first end of both upper right linkage member and lower left linkage member are pivotally attached at a carrying frame about a horizontal-aligned axis;
    said second end of both said upper right linkage member and lower left linage member are attached at a pivot linkage;
    said pivot linkage pivotally coupling the boom lift assembly and the chassis;
    a lift actuator mechanism is configured to be mounted on lower left linkage mechanism and connected to carrying frame;
    wherein said pivot linkage includes a first pivot plate member generally parallel alignment with a second pivot plate member, both first and second pivot plate member in general vertical alignment; said boom lift assembly is pivotally connected between said first and said second pivot plate members; said first and second pivot plate members include a forward end and an opposite rearward free end; said forward end of each first and second pivot plate members are pivotally connected to said chassis; said rearward free end of each first and second pivot plate members is free to pivot away from said chassis; said rearward free end of first and second pivot plate members is pivotally connected at said boom lift assembly; and
    a dampener located between the pivot linkage and the chassis, the dampener configured to reduce transfer of an impact force between the chassis and the boom lift assembly; wherein said dampener dampens vertically on said pivot linkage relative said chassis; said chassis reduces transfer of said impact force into said pivot linkage, boom lift assembly and boom;
    wherein said suspension arrangement placed directly on said chassis to allow said boom link assembly to float independent of the said chassis.

2. The suspension arrangement of claim 1, wherein the dampener includes a compressed fluid.

3. The suspension arrangement of claim 1, wherein as the dampener is a manual type suspension.

4. The suspension arrangement of claim 3, wherein the dampener is comprised of an elastomeric material.

5. The suspension arrangement of claim 3, wherein the dampener includes a spring.

6. The suspension arrangement of claim 1, wherein the pivot linkage comprises a generally horizontal aligned, intermediate plate member extending between the first and second pivot plate members, and wherein the dampener is mounted between the chassis and the intermediate plate member.

7. The suspension arrangement of claim 1, wherein each first and second pivot plate member includes a generally horizontal aligned, linear edge extending between the forward end and the rearward portion, and wherein the rearward portion of both first and second pivot plate members includes a generally vertically aligned edge generally perpendicular to the linear portion, the linear portion and the vertically aligned edge to receive the chassis therebetween.

* * * * *